United States Patent
Asahara et al.

(10) Patent No.: US 8,608,011 B2
(45) Date of Patent: Dec. 17, 2013

(54) FUEL TANK FOR MOTOR VEHICLE

(75) Inventors: Toshiaki Asahara, Aichi Prefecture (JP);
Tomohide Aoki, Aichi Prefecture (JP);
Yasuyuki Washiyama, Aichi Prefecture (JP)

(73) Assignee: FTS Co., Ltd., Toyota, Aichi Prefecture (JP)

( * ) Notice: Subject to any disclaimer, the term of this patent is extended or adjusted under 35 U.S.C. 154(b) by 183 days.

(21) Appl. No.: 13/064,190

(22) Filed: Mar. 9, 2011

(65) Prior Publication Data
US 2011/0226777 A1   Sep. 22, 2011

(30) Foreign Application Priority Data
Mar. 16, 2010   (JP) ................................. 2010-059419

(51) Int. Cl.
*B60K 15/03*   (2006.01)
*B29C 49/20*   (2006.01)

(52) U.S. Cl.
USPC ........... 220/562; 220/501; 220/563; 220/564; 220/653; 428/36.7; 428/35.7; 428/36.6; 264/515; 264/516; 264/523

(58) Field of Classification Search
USPC ......... 428/4.1, 35.7, 36.7; 220/501, 562, 563, 220/653, 564; 264/154, 163
See application file for complete search history.

(56) References Cited

U.S. PATENT DOCUMENTS

| | | | | |
|---|---|---|---|---|
| 2,407,455 A | * | 9/1946 | Shakesby et al. | 220/653 |
| 3,919,373 A | * | 11/1975 | Kormendi | 264/511 |
| 4,584,041 A | * | 4/1986 | Lyman et al. | 156/156 |
| 4,719,072 A | * | 1/1988 | Kojima et al. | 264/515 |
| 4,891,000 A | * | 1/1990 | Ishii | 425/522 |
| 5,031,795 A | * | 7/1991 | Kotera et al. | 220/563 |
| 5,147,064 A | * | 9/1992 | Jonkers et al. | 220/651 |
| 5,308,573 A | * | 5/1994 | Hirakawa | 264/516 |
| 5,326,514 A | * | 7/1994 | Linden et al. | 264/83 |

(Continued)

FOREIGN PATENT DOCUMENTS

JP   01-301227 A   12/1989
JP   2009-132297 A   6/2009

*Primary Examiner* — Mickey Yu
*Assistant Examiner* — Gideon Weinerth
(74) *Attorney, Agent, or Firm* — McGinn Intellectual Property Law Group, PLLC

(57) ABSTRACT

A fuel tank capable of strongly fusion-bonding a built-in part to an inner surface of an outer wall thereof while protecting the outer wall even when an impact, etc. are applied thereto. In the fuel tank for a motor vehicle, which is formed by blow molding, in which the built-in part is mounted, and which has the outer wall composed of a synthetic resin, a plurality of mounting members adapted to mount the built-in part to the fuel tank are provided on the built-in part so as to be fusion-bonded to the inner surface of the outer wall of the fuel tank. An abutment portion is formed on each of the mounting members for contacting the inner surface of the outer wall of the fuel tank, and an abutment surface and a plurality of abutment pins, each projecting from the abutment surface, are formed in the abutment portion. The abutment pin is formed into a columnar or frustum-shaped configuration, each having a circular or elliptical cross-section, and a diameter or a main axis of a projecting end of the abutment pin along with the height of the abutment pin from the abutment surface are formed less than the thickness of the outer wall of the fuel tank.

14 Claims, 6 Drawing Sheets

(56) References Cited

U.S. PATENT DOCUMENTS

| | | | |
|---|---|---|---|
| 5,534,218 A * | 7/1996 | Daubenbuchel et al. | 264/516 |
| 6,135,306 A * | 10/2000 | Clayton et al. | 220/564 |
| 6,138,859 A * | 10/2000 | Aulph et al. | 220/563 |
| 6,338,420 B1 * | 1/2002 | Pachciarz et al. | 220/562 |
| 6,467,507 B1 * | 10/2002 | Engle | 138/112 |
| 6,596,356 B1 * | 7/2003 | Short | 428/36.7 |
| 6,726,967 B2 * | 4/2004 | Vorenkamp et al. | 428/34.1 |
| 6,737,132 B1 * | 5/2004 | Michihata et al. | 428/35.7 |
| 7,455,190 B2 * | 11/2008 | Potter et al. | 220/4.14 |
| 7,584,864 B2 * | 9/2009 | Yamamoto et al. | 220/4.13 |
| 7,867,420 B2 * | 1/2011 | Wolter | 264/154 |
| 8,105,528 B2 * | 1/2012 | Aoki et al. | 264/515 |
| 2005/0016600 A1 * | 1/2005 | Knaggs et al. | 137/590 |
| 2006/0068141 A1 * | 3/2006 | Tsutsumi et al. | 428/36.4 |
| 2008/0038497 A1 * | 2/2008 | Nemoto | 428/35.7 |
| 2009/0139994 A1 | 6/2009 | Aoki et al. | |
| 2009/0230133 A1 * | 9/2009 | Takeuchi et al. | 220/562 |
| 2010/0092600 A1 * | 4/2010 | Hamaji et al. | 425/522 |
| 2011/0000127 A1 * | 1/2011 | Liu et al. | 44/451 |
| 2011/0174946 A1 * | 7/2011 | Araya et al. | 248/225.21 |
| 2011/0221104 A1 * | 9/2011 | Criel et al. | 264/526 |
| 2012/0024868 A1 * | 2/2012 | Menke | 220/653 |
| 2012/0056356 A1 * | 3/2012 | Hall et al. | 264/533 |
| 2012/0152449 A1 * | 6/2012 | Watanabe et al. | 156/245 |
| 2012/0301568 A1 * | 11/2012 | Hirth et al. | 425/215 |
| 2012/0321823 A1 * | 12/2012 | Boecker et al. | 428/34.1 |
| 2013/0192702 A1 * | 8/2013 | Chiasson et al. | 137/565.17 |

* cited by examiner

FUEL TANK FOR MOTOR VEHICLE

CROSS-REFERENCE TO RELATED APPLICATION

This application is related to and claims priority from Japanese patent application No. 2010-059419 incorporated herein by reference.

BACKGROUND OF THE INVENTION

1. Field of the Invention

The present invention relates to a fuel tank made of a thermoplastic synthetic resin and, more particularly, to a fuel tank of which an outer wall is formed by blow molding of the thermoplastic synthetic resin, and within which built-in parts are provided.

2. Description of Related Art

Conventionally, metallic fuel tanks have been used as fuel tanks for motor vehicles, etc., but, in recent years, fuel tanks made of thermoplastic synthetic resins have been used, because they are light in weight, no rust is generated therein, and they can be readily formed into desired configurations.

In many cases, the fuel tanks for use in motor vehicles, which are made of thermoplastic synthetic resins, have been formed by blow molding, because tubular bodies can be readily formed. With a blow molding method, a parison of a molten thermoplastic synthetic resin formed into a cylindrical configuration is extruded from an upper side of a mold, and air is blown into the parison while the parison is being held with the mold, thereby forming the fuel tanks.

On the other hand, in the blow molding method, it has been also required to provide built-in parts such as valves, baffle plates adapted to suppress noise caused by the flowing of fuel, etc. in an interior of the fuel tank.

To respond to this demand, there has been proposed a method of setting a built-in part in a resin frame, setting the resin frame within a mold, and bonding the resin frame to an inner surface of an outer wall of a fuel tank by blow molding, whereby the built-in part is mounted in an interior of the fuel tank (see published Japanese patent application No. Hei 1-301227, for example.)

In this case, however, since the built-in part is held with the resin frame, and is bonded to the inner surface of the outer wall of the fuel tank, an additional work of removing the resin frame is needed after blow molding, and in the case of small-sized built-in parts, the resin frames may become large so that the weight thereof may be increased.

In addition, in order to provide a built-in part in an interior of the fuel tank, there has been also effected such a process as is shown in FIGS. 1 and 2 (see published Japanese patent application No. Hei 6-143396, for example.).

More specifically, as shown in FIG. 1, a built-in part 10 is placed on a holding rod 12 before a parison 14 enters a blow mold 16, and after the blow mold 16 is opened, the built-in part 10 is positioned within the blow mold 16. Then, the parison 14 is lowered with the blow mold 16 left opened, thereby positioning the built-in part 10 in an interior of the parison 14.

Then, as shown in FIG. 2, press pins 18 are made to project from both sides of the blow mold 16 before the blow mold 16 is closed to press the parison 14 against side ends of the built-in part 10. At this time, an inner surface of the parison 14 has not been solidified so that the parison 14 and the side ends of the built-in part 10 can be fusion-bonded together.

And, the holding rod 12 is lowered, the blow mold 16 is closed, and air is blown into the blow mold 16 to perform blow molding.

In this case, abutment surfaces 20 formed at distal ends of the built-in part 10 for abutment with the parison 14, merely contact the inner surface of the parison 14, and the abutment surfaces 20 do not penetrate into the parison 14, whereby adhesion therebetween is week, and the fusion-bonding strength is not sufficiently large so that the parison 14 may peel from the built-in part 10 due to vibrations of fuel, expansions of fuel tanks, etc.

In addition, in order to increase the strength of the fuel tank, there has been also proposed to recess upper and lower portions of the outer wall thereof, and fusion-bond them over several locations thereof. In this case, however, since the outer wall is locally recessed and fusion-bonded together, the interior volume of the fuel tank is unfavorably reduced.

In order to overcome the above-described problem, as shown in FIG. 3, there has been also proposed a mounting member 24 for a built-in part, which has a plurality of arc-shaped elongated projections 26 on an abutment surface 22 thereof with a triangular cross-section (see published Japanese patent application No. 2009-132297, for example.). Air release grooves 28 are provided between adjacent elongated projections 26.

However, since the elongated projections 26 are formed long into an arc-shaped configuration so that when an impact and a bending stress are applied to an outer wall of a fuel tank, not the elongated projections 26 but the outer wall of the fuel tank may be deformed.

SUMMARY OF THE INVENTION

Accordingly, it is an object of the present invention to provide a fuel tank capable of strongly fusion bonding a built-in part to an inner surface of an outer wall thereof, and applying a stress to abutment surfaces of mounting members adapted to mount the built-in part to the fuel tank, thereby protecting the outer wall of the fuel tank even when an impact, etc. are applied thereto.

According to a first aspect of the present invention, in a fuel tank for a motor vehicle, which is formed by blow molding, within which a built-in part is mounted, and which has an outer wall formed from a synthetic resin, a plurality of mounting members are provided on the built-in part. The mounting members are fusion-bonded to an inner surface of the outer wall of the fuel tank to mount the built-in part to the fuel tank. Each of the mounting members has an abutment portion for contacting the inner surface of the outer wall of the fuel tank. The abutment portion has an abutment surface for facing the inner surface of the outer wall of the fuel tank, and a plurality of abutment pins, each projecting from the abutment surface towards the inner surface of the outer wall of the fuel tank. Each abutment pin is formed into a columnar or frustum-shaped configuration, each having a circular or elliptical cross-section. A diameter or a major axis of a projecting end of the abutment pin, and a height of the abutment pin from the abutment surface are formed less than a thickness of the outer wall of the fuel tank.

According to the first aspect of the present invention, since a plurality of mounting members are provided on the built-in part so as to be fusion-bonded to the inner surface of the outer wall of the fuel tank and to mount the built-in part to the fuel tank, the built-in part can be fusion-bonded to the inner surface of the outer wall of the fuel tank in a plurality of positions, whereby it can be securely mounted within the fuel tank.

Since the abutment portion is formed on the mounting member for abutment with the inner surface of the outer wall of the fuel tank, the abutment portion is fusion-bonded to the inner surface of the outer wall to securely fix the mounting member.

The abutment portion has an abutment surface for facing the inner surface of the outer wall of the fuel tank, and a plurality of abutment pins, each projecting from the abutment surface towards the inner surface of the outer wall of the fuel tank. Therefore, a plurality of abutment pins penetrate into the outer wall of the fuel tank, and are fusion-bonded thereto, whereby the mounting members can be strongly bonded to the outer wall of the fuel tank.

Since the abutment pins are formed into a columnar or frustum-shaped configuration, each having a circular or elliptical cross-section, they are formed not continuously but independently of each other so that the strength of the abutment pins is smaller than that of the outer wall of the fuel tank, and consequently, where an impact, a bending stress, etc. are applied to the outer wall of the fuel tank, damage occurs only in the abutment pins to which the impact, etc. are applied, but does not spread to the outer wall of the fuel tank and adjacent abutment pins, whereby the outer wall of the fuel tank is not affected thereby. Since the cross-sectional shape of the abutment pins is circular or elliptical, the abutment pins have no acute-angled part so that the impact, etc. applied to the outer wall of the fuel tank do not concentrate at specific areas.

Since the diameter or the major axis of a projecting end of each abutment pin, and the height thereof from the abutment surface are formed less than the thickness of the outer wall of the fuel tank, the strength of the abutment pins is smaller than that of the outer wall of the fuel tank, and consequently, where an impact, a bending stress, etc. are applied to the outer wall of the fuel tank, the abutment pins are damaged, but the outer wall of the fuel tank is not affected by the damage of the abutment pins. And a maximum value of a depth by which the abutment pins penetrate into the outer wall when the mounting member is fusion bonded to the outer wall of the fuel tank can be adjusted.

According to a second aspect of the present invention, the height of the abutment pin from the abutment surface ranges from 30% to 70% of the thickness of the outer wall of the fuel tank.

In the second aspect of the present invention, since the height of each abutment pin from the abutment surface ranges from 30% to 70% of the thickness of the outer wall of the fuel tank, the abutment pins can penetrate into the outer wall of the fuel tank sufficiently so as to contact fused areas in the outer wall of the fuel tank, whereby projecting ends of the abutment pins are readily fusion-bonded to the outer wall of the fuel tank so as to be securely fusion-bonded thereto. Furthermore, since the height of each abutment pin from the abutment surface ranges from 30% to 70% of the thickness of the outer wall of the fuel tank, the abutment pins are prevented from penetrating into the outer wall excessively so as not to reduce the strength thereof. Where the height of each abutment pin from the abutment surface is less than 30%, a sufficient fusion-bonding force cannot be obtained, whereas where the height of each abutment pin from the abutment surface exceeds 70%, the abutment pin may penetrate into the outer wall excessively, and reduce the strength of the outer wall.

According to a third aspect of the present invention, intervals between adjacent abutment pins range from 1 mm to 3 mm.

According to the third aspect of the present invention, since the intervals between adjacent abutment pins range from 1 mm to 3 mm, the abutment pins can penetrate into the outer wall of the fuel tank sufficiently, and the number of the abutment pins can be increased, whereby the fusion-bonding strength against the fuel tank can be ensured. Where the intervals between adjacent abutment pins are less than 1 mm, the intervals become too narrow so that a fused resin composing the outer wall is difficult to enter spaces between the adjacent abutment pins, and consequently, the abutment pins cannot penetrate into the outer wall of the fuel tank sufficiently. Where the intervals between adjacent abutment pins exceed 3 mm, the intervals become too great so that the number of abutment pins decreases, and consequently, the fusion-bonding strength against the outer wall of the fuel tank is reduced.

According to a fourth aspect of the present invention, the abutment pins are provided over approximately an entire surface of the abutment surface.

According to the fourth aspect of the present invention, since the abutment pins are provided over approximately an entire surface of the abutment surface, the number of the abutment pins can be increased so that the entire surface of the abutment surface can be fusion-bonded to the outer wall of the fuel tank, whereby the fusion-bonding strength against the outer wall of the fuel tank can be ensured.

According to a fifth aspect of the present invention, the mounting member is formed separately from or integrally with the built-in part, and is then engaged with the built-in part.

According to the fifth aspect of the present invention, the mounting member is formed separately from or integrally with the built-in part, and is then engaged with the built-in part. Therefore, where the mounting member is formed separately, the mounting member can be readily molded, and the configuration of the abutment surface of the mounting member can be formed freely. In addition, the material for the mounting member can be readily selected, and a fuel oil-resistant material that is readily fusion-bonded to the outer wall of the fuel tank can be selected. Where the mounting member is formed integrally with the built-in part, they can be formed together by one blow molding so that the production costs are inexpensive.

According to a sixth aspect of the present invention, the outer wall of the fuel tank is formed by five layers including an exterior main layer, an exterior adhesive layer, a barrier layer, an interior adhesive layer and an interior main layer which are arranged in that order from an exterior side of the outer wall, the exterior main layer and the interior main layer are formed from a high-density polyethylene (HDPE), the barrier layer is formed from an ethylene-vinyl alcohol copolymer (EVOH), and the exterior adhesive layer and the interior adhesive layer are formed from a synthetic resin exhibiting adhesion to both the high-density polyethylene (HDPE) and the barrier layer.

According to the sixth aspect of the present invention, since the exterior main layer and the interior main layer are formed from a high-density polyethylene (HDPE), the exterior side of the fuel tank exhibits sufficient rigidity and impact resistance, and even when fuel penetrates into the interior main layer, the rigidity of the fuel tank can be ensured, and the impact resistance can be improved.

Since the barrier layer is formed from an ethylene-vinyl alcohol copolymer (EVOH), it exhibits excellent gasoline impermeability, enables fusion molding, and is excellent in processing characteristics. In addition, it exhibits excellent impermeability under high humidity atmospheres or against gasoline containing alcohol.

Since the exterior adhesive layer and the interior adhesive layer are formed from a synthetic resin exhibiting adhesion to both the high-density polyethylene (HDPE) and the barrier layer, the exterior adhesive layer and the interior adhesive layer securely bond the barrier layer to both the exterior main layer and the interior main layer, thereby securely bonding layers of the fuel tank together to ensure the fuel impermeability and the strength of the fuel tank.

According to a seventh aspect of the present invention, the built-in part further has a baffle plate or a valve for suppressing flowing noise of fuel.

According to the seventh aspect of the present invention, since the baffle plate or the valve for suppressing flowing noise of fuel is formed in the built-in part, the baffle plate or the valve can be mounted with the blow molding of the fuel tank, and consequently, the fuel tank capable of discharging fuel, preventing of discharge of fuel vapor, and suppressing the flowing noise of fuel can be readily produced.

Since the mounting member for the built-in part of the fuel tank has an abutment portion, and the abutment portion has an abutment surface and abutment pins, the abutment surface is brought into close contact with the inner surface of the outer wall of the fuel tank to adjust a maximum value of the depth by which the abutment pins penetrate into the outer wall of the fuel tank, and since the abutment pins penetrate into the outer wall of the fuel tank, they can be strongly fusion-bonded to the outer wall of the fuel tank.

Since the abutment pin is formed to have a columnar or frustum-shaped configuration with a circular or elliptical cross-section, where an impact, bending stress, etc. are applied to the outer wall of the fuel tank, the abutment pins respectively absorb such as an impact, etc. to prevent it from spreading, whereby the outer wall of the fuel tank is not affected.

Since the diameter or the major axis of the projecting end of the abutment pin along with the height of the abutment pin from the abutment surface are formed less than the thickness of the outer wall of the fuel tank, the strength of the abutment pin is lower than that of the outer wall of the fuel tank, whereby where an impact, bending stress, etc. are applied to the outer wall of the fuel tank, the abutment pins are damaged so as not to affect the outer wall of the fuel tank.

Other objects, features, and characteristics of the present invention will become apparent upon consideration of the following description and the appended claims with reference to the accompanying drawings, all of which form a part of this specification.

DETAILED DESCRIPTION OF THE PREFERRED EMBODIMENTS

Hereinafter, an embodiment of a fuel tank for use in a motor vehicle in accordance with the present invention will be explained with reference to FIG. 4 through FIG. 12.

Figure 1:
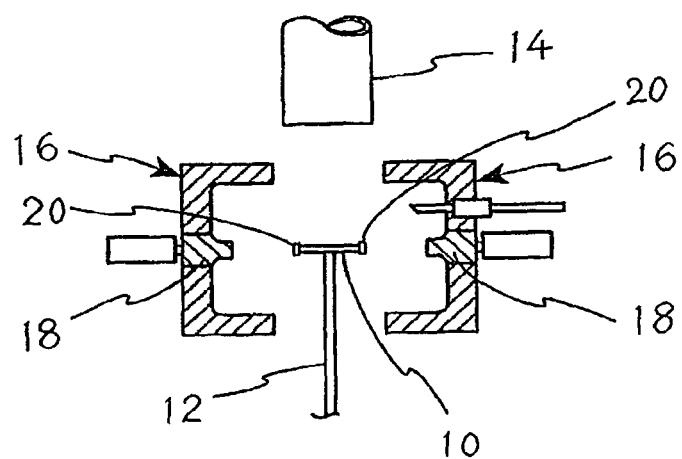
FIG. 1 is a sectional view of a blow mold in a closed state, which is used in a method for producing a conventional fuel tank.
Figure 2:
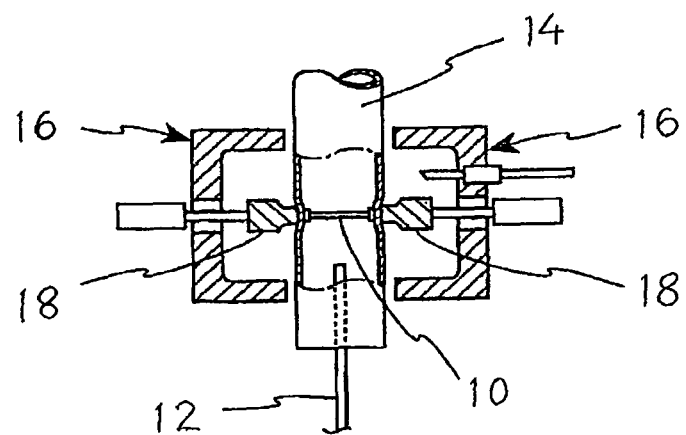
FIG. 2 is a sectional view of a blow mold in a state where press pins are slid, which is used in a method for producing a conventional fuel tank.
Figure 3:
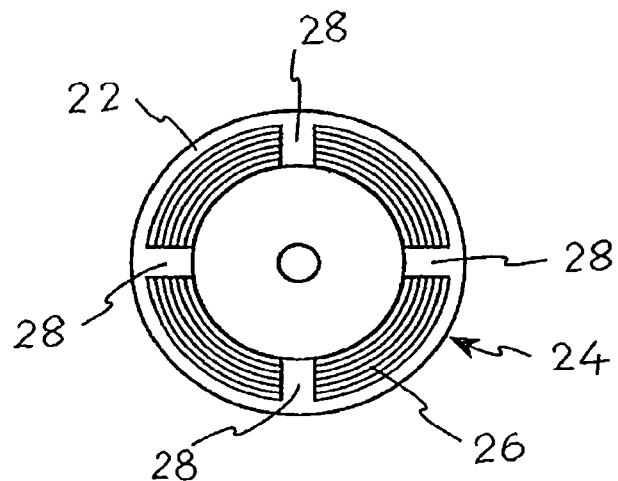
FIG. 3 is a plan view of a conventional mounting member.
Figure 4:
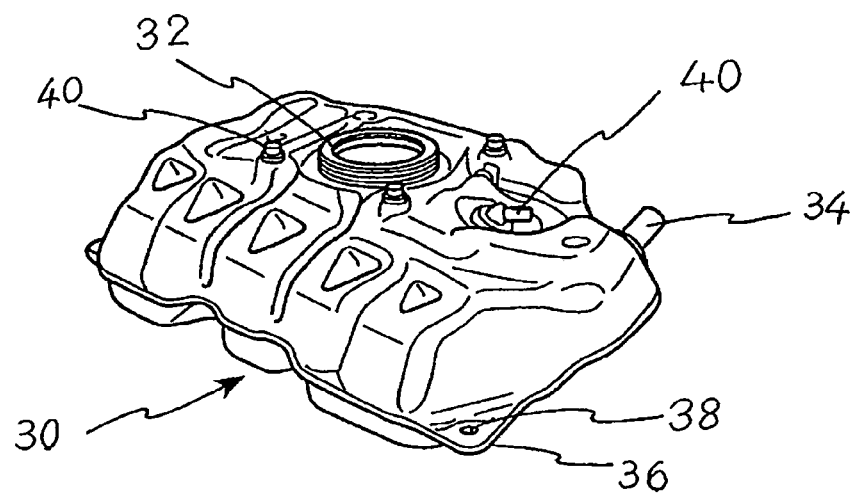
FIG. 4 is a perspective view of a fuel tank in an embodiment of the present invention.
Figure 5:
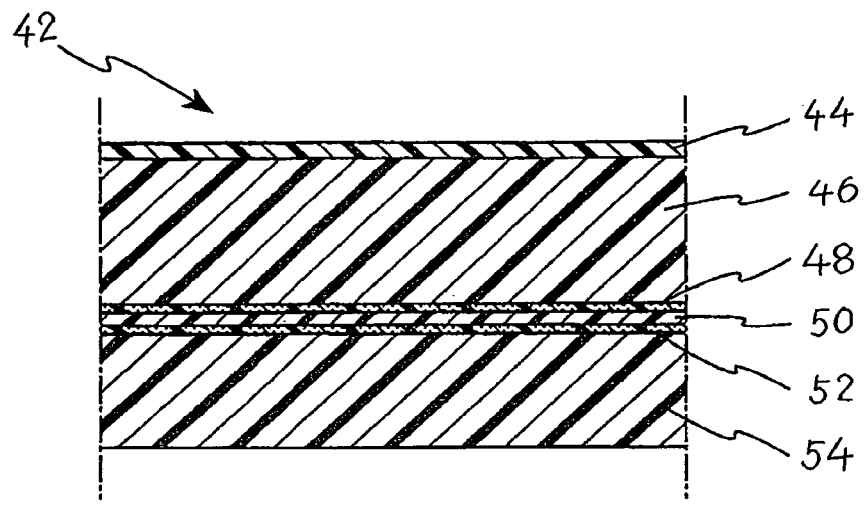
FIG. 5 is a partial enlarged sectional view showing the construction of an outer wall of a fuel tank in accordance with the present invention.

As shown in FIG. 4, a fuel tank 30 has a pump unit mounting hole 32 in an upper surface thereof for inserting and extracting a fuel pump (not shown) into and from the fuel tank 30. And, a fuel inlet hole 34 is formed in a side surface or the upper surface of the fuel tank 30 for supplying fuel from an inlet pipe (not shown).

In addition, an outer circumferential rib 36 is formed around the fuel tank 30 over an entire length thereof, and a plurality of mounting holes 38 are formed in the outer circumferential rib 36 in predetermined positions such as corners, etc. thereof. By bolting the mounting holes 38 and a vehicle body together, the fuel tank 30 is mounted on the vehicle body. Alternatively, the fuel tank 30 can be also mounted on the vehicle body by means of a belt wound around the fuel tank 30 without forming the mounting holes 38.

In addition, mounting holes 40 are formed in the upper surface of the fuel tank 30 for connecting a hose adapted to collect evaporated fuel from an interior of the fuel tank, etc. thereto.

In the present embodiment, the fuel tank 30 is formed by blow molding. An outer wall 42 of the fuel tank 30 includes a skin layer 44, an exterior main layer 46, an exterior adhesive layer 48, a barrier layer 50, an interior adhesive layer 52 and an interior main layer 54 which are formed in that order from an exterior side thereof.

Upon blow molding, a parison composed of the above-described six layers is used. A parison composed of more than six layers can be also used. As will be described later, the skin layer 44 is used where a reground material or a filler, etc. is mixed into the exterior main layer 46, but the skin layer 44 can be omitted. In addition, where a material exhibiting rigidity and fuel oil resistance is used, a parison composed of a single layer can be also used.

The skin layer 44 and the exterior main layer 46 are formed from a thermoplastic synthetic resin exhibiting a high impact resistance and keeping rigidity against fuel oil, and are preferably formed from a high-density polyethylene (HDPE). When the exterior main layer 46 contains an inorganic filler, the skin layer 44 is used for covering a surface of the exterior main layer 46. With this arrangement, the inorganic filler is not exposed so that the surface of the outer wall 42 can be made smooth.

The polyethylene exhibiting a melt rate of flow (MRF: 21.6 kg/10 min) ranging from 5 to 7 and a density ($g/cm^3$) ranging from 0.944 to 0.950, for example, can be used as the high-density polyethylene (HDPE) for the skin layer 44, the exterior main layer 46 and the interior main layer 54.

The exterior main layer 46 may be formed from a reground material mainly containing a high-density polyethylene (HDPE) as a main material thereof. The reground material mainly containing a high-density polyethylene (HDPE) is obtained by regrinding fuel tanks reclaimed after use, or regrinding cut pieces and defectives produced during the producing process of fuel tanks. Since the fuel tank 30 is mainly composed of the high-density polyethylene (HDPE), the reground material from the fuel tank mainly contains the high-density polyethylene (HDPE).

The reground materials thus obtained may be used at 100% of the material for the exterior main layer 46, or a newly prepared high-density polyethylene (HDPE) may be mixed into the reground materials thus obtained.

The barrier layer 50 is formed from a thermoplastic synthetic resin which merely passes a very small amount of fuel oil. Examples of the thermoplastic synthetic resin composing the barrier layer 50 include ethylene-vinyl alcohol copolymer (EVOH), polybutylene terephthalate, polyethylene terephthalate, polyphenylene sulfide (PPS), liquid crystal polymer (LCP), and semi-aromatic nylon (PPA), but ethylene-vinyl alcohol copolymer (EVOH) is preferred.

Since the barrier layer 50 is provided, fuel oil such as gasoline, etc. penetrated through the interior main layer 54 can be prevented from further penetrating by virtue of the barrier layer 50, whereby fuel oil can be prevented from evaporating into the air.

Where ethylene-vinyl alcohol copolymer (EVOH) is used as the barrier layer 50, it exhibits excellent gasoline impermeability, and enables fusion molding so as to exhibit excellent workability. In addition, it also exhibits excellent gasoline impermeability even under a high humidity condition. Furthermore, it also exhibits excellent impermeability against gasoline containing alcohol.

The exterior adhesive layer 46 is provided between the exterior main layer 46 and the barrier layer 50 to bond these layers together, whereas the interior adhesive layer 52 is provided between the interior main layer 54 and the barrier layer 50 to bond these layers together. The exterior adhesive layer 48 and the interior adhesive layer 52 are formed from the same material, that is a synthetic resin exhibiting adhesion to both the high-density polyethylene (HDPE) and the barrier layer 48. Therefore, the exterior adhesive layer 48 and the interior adhesive layer 52 strongly bond the barrier layer 50, the exterior main layer 46 and the interior main layer 54 to each other so that these layers are brought into integrally close contact with each other, whereby the fuel impermeability and strength of the fuel tank 30 can be ensured.

Examples of the adhesive thermoplastic synthetic resin for use as the exterior adhesive layer 48 and the interior adhesive layer 52 include modified polyolefin resins. Unsaturated carboxylic acid modified polyolefin resin, and particularly unsaturated carboxylic acid modified polyethylene resin, is preferred. They can be produced by copolymerization or graft polymerization of unsaturated carboxylic acid and polyolefin resin.

The interior main layer 54 is formed from the high-density polyethylene (HDPE) that is the same material with that of the skin layer 44 described above.

The interior main layer 54 has a thickness ranging from 15% to 67% of the entire thickness of the outer wall 42 of the fuel tank 30. The entire thickness of the outer wall 42 ranges from 3 mm to 8 mm so that the interior main layer 54 has a thickness ranging from 0.45 mm to 5.36 mm. Therefore, the interior main layer 54 of the outer wall 42 of the fuel tank 30 has a sufficient thickness so that the outer wall 42 can keep rigidity and ensure a high impact resistance even if it swells with fuel oil.

Figure 6:
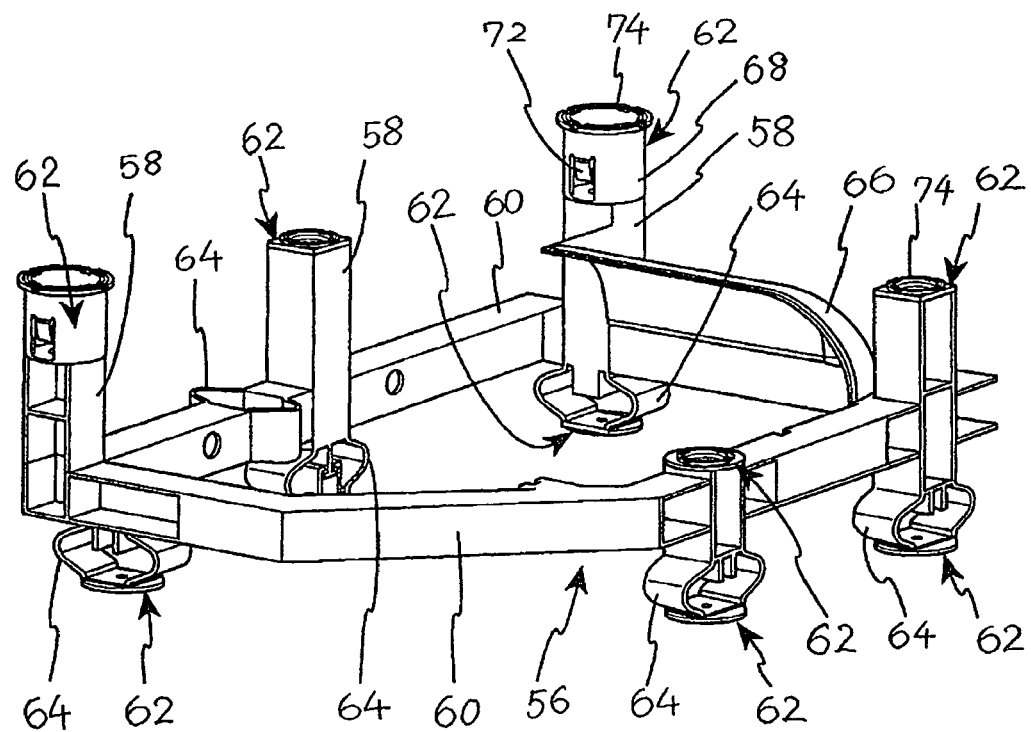
FIG. 6 is a perspective view of a built-in part adapted to be mounted in an interior of the fuel tank in accordance with the present invention.

A built-in part 56 as shown in FIG. 6, for example, is mounted in the interior of the fuel tank 30. The mounting method of the built-in part 56 will be explained later.

Next, the built-in part 56 will be explained based on FIG. 6. The built-in part 56 has a plurality of pillar members 58 which support upper and lower parts of an inner surface of the outer wall of the fuel tank 30, and beam members 60 which connect the pillar members 58 to each other.

A mounting member 62 is secured to a distal end of the pillar member 58, which is adapted to contact the inner surface of the outer wall of the fuel tank 30. In the present embodiment, the mounting member 62 is formed separately from the pillar member 58, and secured to a distal end thereof, but, the pillar member 58 and the mounting member 62 may be formed integrally with each other.

The mounting member 62 will be described later.

The pillar members 58 are mounted in predetermined positions in the interior of the fuel tank 30 by fusion bonding the mounting members 62 to the inner surface of the outer wall of the fuel tank 30, as will be described later, thereby holding the outer wall of the fuel tank 30 in a plurality of positions thereof. Therefore, the strength of the outer wall of the fuel tank 30 can be increased, and the expansion and contraction of the fuel tank 30 can be prevented while keeping the strength against an applied impact.

As shown in the left end portion of FIG. 6, an upper mounting member 62 and a lower mounting member 62 may be provided slightly out of alignment with each other with respect to the beam member 60.

In addition, in order to overcome problems caused by contraction and expansion of the outer wall of the fuel tank 30, a dimension change preventing member 64 can be formed in the pillar member 58.

The beam members 60 connect the pillar members 58 to each other, and can be mounted in predetermined positions of the inner surface of the outer wall of the fuel tank 30. In order to reduce the weight and endure the rigidity, the beam members 60 can be formed to have a U-shaped cross-section or a tubular configuration.

And, as shown in FIG. 6, a baffle plate 66 can be formed integrally with the beam member 60. With this arrangement, lapping of fuel in the interior of the fuel tank 30 is prevented to suppress flowing noise of fuel therein.

In addition to the baffle plate 66, valves connected to various types of hoses, sub-tanks provided in the interior of the fuel tank 30, etc. can be provided on the beam members 60.

Furthermore, in order to overcome problems caused by contraction and expansion of the outer wall of the fuel tank 30, a dimension change preventing member 64 can be formed in the beam member 60.

The built-in part 56 can be formed from a thermoplastic synthetic resin having a fuel oil resistance, such as polyacetal, a high-density polyethylene (HDPE), etc. With this arrangement, the strength of the fuel tank 30 can be increased, and when the built-in part 56 is mounted in the interior of the fuel tank 30, the rigidity thereof is not lowered due to swelling with fuel oil, etc.

Next, the mounting member 62 will be explained. The mounting member 62 may be formed into a tubular configuration with a circular cross-section, as shown in FIG. 6, or a square cross-section, or formed into a flat configuration.

Figure 7:
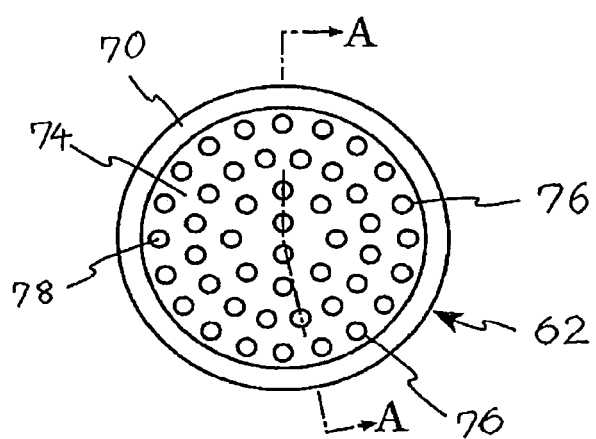
FIG. 7 is a plan view of a mounting member of the fuel tank in the present invention.
Figure 8:
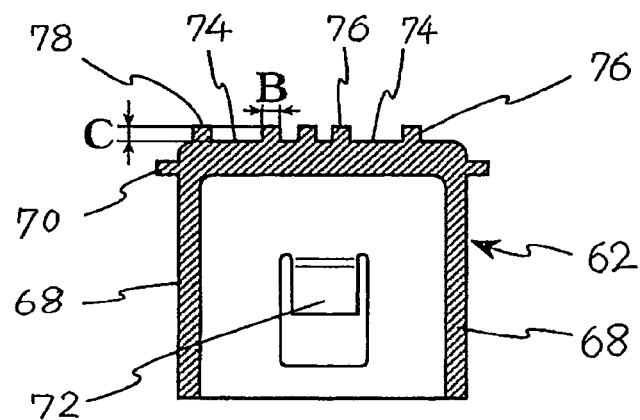
FIG. 8 is a sectional view of a mounting member of the fuel tank in the present invention, which is taken along the line A-A in FIG. 7.
Figure 9:
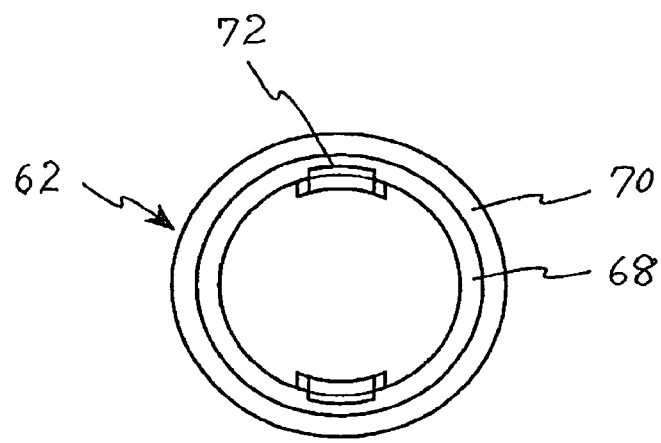
FIG. 9 is a bottom view of a mounting member of the fuel tank in the present invention.

The mounting member 62 formed into a tubular configuration with a circular cross-section will be explained based on FIGS. 7 through 9. FIG. 7 is a plan view of the mounting member 62, FIG. 8 is a sectional view thereof, and FIG. 9 is a bottom view thereof.

The mounting member 62 has a connecting portion 68 connecting or continuing to the built-in part 56, and an abutment portion 70 for abutment with the inner surface of the outer wall of the fuel tank 30.

In the present embodiment, the mounting member 62 is formed separately from the built-in part 56, and the connecting portion 68 is formed into a tubular configuration with a circular cross-section, which conforms to the configuration of the pillar member 58. Where the pillar member 58 has a square cross-section, the connecting portion 68 is formed to have a rectangular cross-section. A locking portion 72 is provided at a lower part of the connecting portion 68, and when the connecting portion 68 is fitted in the distal end of the pillar member 58, as shown in FIG. 8 and FIG. 9, a claw of the locking portion 72 is engaged with a depression or hole formed in the distal end of the pillar member 58, whereby the mounting member 62 is securely attached. In order to fusion-bond the mounting member 62 to the outer wall of the fuel tank 30, the mounting member 62 is formed using the same kind of the material with that of the outer wall.

Where the mounting member 62 is formed integrally with the pillar member 58, the connecting portion 68 is formed continuously with the pillar member 58.

Where the mounting member 62 has a flat plate-shaped configuration, no connecting portion is provided therein, but it is directly attached to the distal end of the pillar member 58 through locking or bonding with a projection or a bonding surface provided on a lower surface of the abutment portion 70.

The abutment portion 70 has an abutment surface 74 with a circular configuration, which is adapted to face the inner surface of the outer wall of the fuel tank 30, and a plurality of abutment pins 76 projecting from the abutment surface 74 toward the outer wall of the fuel tank 30. The abutment pin 76 is formed into a cylinder or frustum-shaped configuration with a circular or elliptical cross-section. In the present embodiment, the abutment pin 76 is formed into a cylinder-shaped configuration with a circular cross-section. The abutment pin 76 can be also formed into a frustum-shaped configuration, or a cylinder-shaped or frustum-shaped configuration with an elliptical cross-section.

The abutment pins 76 are not formed continuously, but formed independently of each other so as to exhibit a lower strength than that of the outer wall of the fuel tank 30. Therefore, when an impact, a bending stress, etc. are applied to the outer wall of the fuel tank 30, the abutment pins 76 are damaged, but the outer wall of the fuel tank 30 is not affected thereby. In addition, the damage of the abutment pins 76 does not spread to adjacent abutment pins 76. Since the abutment pins 76 are respectively formed into a circular or elliptical cross-section, they do not have any acute angled part so that even when an impact is applied to the outer wall of the fuel tank 30, a resultant stress is prevented from being concentrated on specific areas so that when the abutment pins 76 are fusion-bonded to the outer wall of the fuel tank 30 upon bonding the mounting member 62, the strength of the outer wall of the fuel tank 30 can be maintained.

A projecting end 78 of the abutment pin 76 has a diameter B in the case of a circular cross-section, or has a major axis in the case of an elliptical cross-section, which is formed smaller than the thickness of the outer wall of the fuel tank 30. It is preferable that the diameter or the major axis of the projecting end 78 of the abutment pin 76 ranges from 30% to 70% of the thickness of the outer wall of the fuel tank 30. In the present embodiment, the thickness of the outer wall of the fuel tank 30 ranges from 3 to 8 mm, as described above, so that the diameter or the major axis ranges from about 0.9 to about 5.6 mm. In the embodiment illustrated in FIG. 8, the diameter of the projecting end 78 of the abutment pin 76 is 1.5 mm.

Therefore, the strength of the abutment pin 76 is lower than that of the outer wall of the fuel tank 30 so that when an impact, a bending stress, etc. are applied to the outer wall of the fuel tank 30, only the abutment pins 76 are cracked and damaged so as not to affect the outer wall.

In addition, the height C of the abutment pins 76 from the abutment surface 74 is formed less than the thickness of the outer wall of the fuel tank 30. Therefore, when the abutment surface 74 closely contacts the inner surface of the outer wall of the fuel tank 30 and the abutment pins 76 penetrate into the outer wall of the fuel tank 30, a maximum penetrating value of the abutment pins 76 can be adjusted, and when the abutment pins 76 penetrate into the outer wall of the fuel tank 30, they can be strongly fusion-bonded to the outer wall of the fuel tank 30.

It is preferable that the height of the abutment pins 76 from the abutment surface 74 ranges from 30% to 70% of the thickness of the outer wall of the fuel tank 30. In the present embodiment, the thickness of the outer wall of the fuel tank 30 ranges from 3 to 8 mm so that the height of the abutment pins 76 ranges from about 1.5 to about 5 mm. In the embodiment shown in FIG. 8, the height of the abutment pins 76 from the abutment surface 74 is 1.5 mm.

Therefore, when the abutment surface 74 is pressed against the outer wall of the fuel tank 30, the abutment pins 76 sufficiently penetrate into the outer wall of the fuel tank 30, and contact a fused area of the outer wall of the fuel tank 30, whereby the projecting end 78 of the abutment pin 76 can be fusion-bonded to the outer wall of the fuel tank 30. Therefore, the outer wall of the fuel tank 30 and the abutment portion 70 can be strongly fusion-bonded to each other. In addition, since the height of the abutment pin 76 ranges from 30% to 70% of the thickness of the outer wall of the fuel tank 30, the abutment pins 76 are prevented from excessively biting into the outer wall so as not to lower the strength of the outer wall.

In the present embodiment, intervals between adjacent abutment pins 76 are determined to range from 1 mm to 3 mm. With this arrangement, when the mounting member 62 is fusion-bonded to the outer wall of the fuel tank 30, a fused inner surface of the outer wall can enter between adjacent abutment pins 76, whereby the abutment pins 76 can sufficiently penetrate into the outer wall of the fuel tank 30. In addition, the intervals between adjacent abutment pins 76 are not too great so that the number of the abutment pins 76 can be increased, thereby ensuring the fusion-bonding strength against the outer wall of the fuel tank 30.

In this case, when the abutment portion 70 is pressed against the inner surface of the outer wall of the fuel tank 30, which is the parison 84, the fused outer wall can enter between adjacent abutment pins 76, whereby the outer wall of the fuel tank 30 and the abutment surface 74 can be strongly fixed to each other.

Where the intervals between adjacent abutment pins 76 are less than 1 mm, it is too narrow so that the abutment pins 76 cannot sufficiently penetrate into the outer wall of the fuel tank 30. Where the intervals between adjacent abutment pins 76 exceed 3 mm, it is too wide so that the number of the abutment pins 76 formed on the abutment surface 74 becomes small and accordingly the fusion-bonding strength against the outer wall of the fuel tank 30 is lowered.

In the present embodiment, as shown in FIG. 7, the abutment pins 76 are formed over approximately an entire abutment surface 74. Therefore, a large number of abutment pins 76 can be formed on the abutment surface 74, and consequently, the abutment surface 74 can be entirely fusion-bonded to the outer wall of the fuel tank 30, whereby the fusion-bonding strength against the outer wall of the fuel tank 30 can be ensured.

Alternatively, the abutment pins 76 can be formed on the abutment surface 74 into a frustum-shaped configuration. In this case, the cross-sectional area of the projecting end of the abutment pin 76 becomes smaller so that when the outer wall of the fuel tank 30 and the abutment pins 76 are fusion-bonded to each other, and the projecting end of the abutment pins 76 penetrate into the outer wall of the fuel tank 30, the fused outer wall readily enters spaces between adjacent abutment pins 76, whereby the outer wall and the abutment pins 76 become readily integral with each other so as to be strongly fusion-bonded to each other. In addition, since the abutment pins 76 are formed into a frustum-shaped configuration, the fused resin located between the adjacent abutment pins 76 blocks the abutment pins 76 from deeply penetrating into the outer wall of the fuel tank 30.

Next, the producing method of the fuel tank 30 in accordance with the present invention by blow molding will be explained based on FIGS. 10 through 12.

Figure 10:
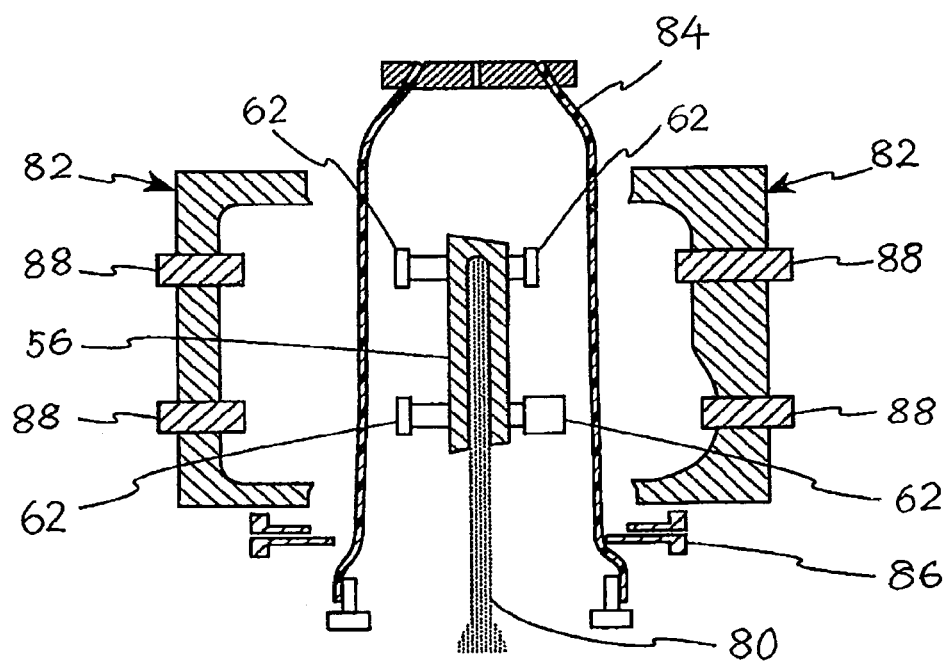
FIG. 10 is a sectional view of a blow mold in an open state, which is used in a method for producing a fuel tank in accordance with the present invention.

First, as shown in FIG. 10, the built-in part 56 is held by a holding rod 80, and is positioned in an interior of a blow mold 82 in an open state. Then, a parison 84 is lowered such that the built-in part 56 is positioned in an interior of the parison 84.

Figure 11:
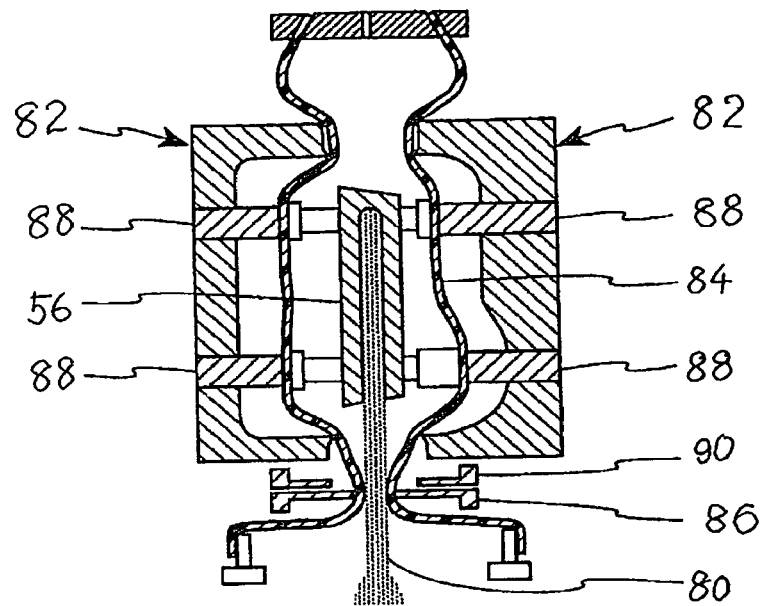
FIG. 11 is a sectional view of a blow mold in a state where press pins are slid, which is used in a method for producing a fuel tank in accordance with the present invention.

Then, as shown in FIG. 11, first pinching plates 86 are slid to hold a lower end of the parison 84 along with the holding rod 80, and a plurality of press pins 88 provided in the blow mold 82 are slid to press the parison 84 against the mounting members 62 attached to the built-in part 56 in such a manner as to hold the parison 84 therewith.

Then, the inner surface of the parison 84 is still in a fused state, and consequently, as described above, the abutment pins 76 of the abutment portions 68 of the mounting members 62 penetrate into the inner surface of the parison 84, whereby the abutment portions 68 and the parison 84 are fusion-bonded to each other. At this time, the built-in part 56 is held with the holding rod 80 so that the mounting members 62 and the built-in part 56 can be securely attached in prescribed positions of the outer wall of the fuel tank 30.

Figure 12:
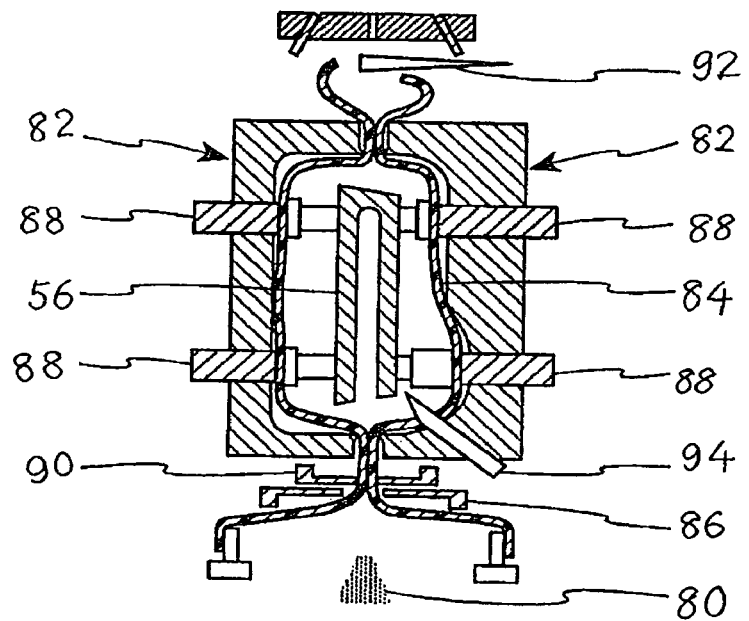
FIG. 12 is a sectional view of a blow mold in a closed state, which is used in a method for producing a fuel tank in accordance with the present invention.

Thereafter, as shown in FIG. 12, the holding rod 80 is lowered and removed from the blow mold 82, second pinching plates 90 are slid to close the parison 84, the blow mold 82 is closed, and the parison 84 is cut with a slide cutter 92. After the blow mold 82 is closed, the press pins 88 continuously press the parison 84, thereby continuously holding the built-in part 56 in the prescribed position.

And air is blown into the interior of the parison 84 from an air nozzle 94 to press an outer surface of the parison 84 against the blow mold 82, thereby producing the fuel tank 30. At this time, projecting ends of the press pins 88 can become flush with the inner surface of the blow mold 82, defining a cavity thereof.

Thereafter, the blow mold 82 is opened, and the molded fuel tank 30 is removed therefrom.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A fuel tank for a motor vehicle, which is formed by blow molding, the fuel tank comprising:
a built-in part mounted in the fuel tank; and
an outer wall comprising a synthetic resin,
wherein a plurality of mounting members are provided on the built-in part, said mounting members are fusion-bonded to an inner surface of the outer wall of the fuel tank to mount the built-in part to the fuel tank, each of said mounting members comprises an abutment portion for contacting said inner surface of the outer wall of the fuel tank, and said abutment portion comprises an abutment surface for facing said inner surface of the outer wall of the fuel tank, and a plurality of abutment pins, each projecting from said abutment surface towards said inner surface of the outer wall of the fuel tank,
and wherein the abutment pins have either a circular or elliptical cross section;
and wherein the abutment pins extend vertically with either a constant cross section resulting in a columnar shape or may extend vertically while tapering inward to form a frustum shape;
and wherein the diameter of said circular cross sections or the major axis of the elliptical cross sections are each less than a thickness of the outer wall of the fuel tank;
and wherein a height of said each abutment pin from said abutment surface ranges from 30% to 70% of said thickness of the outer wall of the fuel tank.

2. A fuel tank for a motor vehicle as claimed in claim 1, wherein intervals between adjacent abutment pins range from 1 mm to 3 mm.

3. A fuel tank for a motor vehicle as claimed in claim 1, wherein said abutment pins are provided over approximately an entire surface of said abutment surface.

4. A fuel tank for a motor vehicle as claimed in claim 1, wherein said mounting members are formed separately from or integrally with the built-in part, and then are engaged with the built-in part.

5. A fuel tank for a motor vehicle as claimed in claim 1, wherein the outer wall of the fuel tank comprises five layers including an exterior main layer, an exterior adhesive layer, a barrier layer, an interior adhesive layer, and an interior main layer which are arranged in that order from an exterior side of the outer wall, said exterior main layer and said interior main layer comprising a high-density polyethylene (HDPE), said barrier layer comprising an ethylene-vinyl alcohol copolymer (EVOH), and said exterior adhesive layer and said interior adhesive layer comprising a synthetic resin exhibiting adhesion to both the high-density polyethylene (HDPE) and said barrier layer.

6. A fuel tank for a motor vehicle as claimed in claim 1, wherein the built-in part further comprises one of baffle plates for suppressing flowing noise of fuel and valves.

7. A fuel tank for a motor vehicle as claimed in claim 1, wherein said each abutment pin is formed into the columnar configuration having the circular cross-section.

8. A fuel tank for a motor vehicle as claimed in claim 1, wherein an entirety of said each abutment pin is formed into the columnar configuration having the circular cross-section.

9. A fuel tank for a motor vehicle as claimed in claim 1, wherein the built-in part comprises a plurality of pillar members which support upper and lower parts of the inner surface of the outer wall of the fuel tank; and
beam members which connect the pillar members to each other.

10. A fuel tank for a motor vehicle as claimed in claim 9, wherein the mounting members are secured to a distal end of the pillar members.

11. A fuel tank for a motor vehicle as claimed in claim 10, wherein the mounting members comprise an upper mounting member and a lower mounting member provided, in opposing sides of each of the pillar members, out of alignment with each other with respect to the beam members.

12. A fuel tank for a motor vehicle as claimed in claim 11, further comprising:
   dimension change preventing members provided in the pillar members.

13. A fuel tank for a motor vehicle as claimed in claim 9, wherein the mounting members are integrally formed with the pillar members.

14. A fuel tank for a motor vehicle as claimed in claim 1, wherein the mounting members comprise a same material as a material of the outer wall.

\* \* \* \* \*